(12) United States Patent
Cailleaux et al.

(10) Patent No.: US 10,843,865 B2
(45) Date of Patent: Nov. 24, 2020

(54) INNER LINER FOR CONTAINER FOR CONSUMER ARTICLES

(71) Applicant: PHILIP MORRIS PRODUCTS S.A., Neuchatel (CH)

(72) Inventors: Timothee Cailleaux, Divonne-les-Bains (FR); Marion Birgit Simone Kamphoff, Berlin (DE); Peter Nimpsch, Berlin (DE)

(73) Assignee: Philip Morris Products S.A., Neuchatel (CH)

( * ) Notice: Subject to any disclaimer, the term of this patent is extended or adjusted under 35 U.S.C. 154(b) by 0 days.

(21) Appl. No.: 16/348,597

(22) PCT Filed: Nov. 13, 2017

(86) PCT No.: PCT/EP2017/079016
§ 371 (c)(1),
(2) Date: May 9, 2019

(87) PCT Pub. No.: WO2018/091398
PCT Pub. Date: May 24, 2018

(65) Prior Publication Data
US 2019/0270578 A1 Sep. 5, 2019

(30) Foreign Application Priority Data
Nov. 18, 2016 (EP) .................................. 16199690

(51) Int. Cl.
*B65D 85/10* (2006.01)
*B32B 15/08* (2006.01)
(Continued)

(52) U.S. Cl.
CPC .......... *B65D 85/1045* (2013.01); *B32B 15/08* (2013.01); *B32B 15/12* (2013.01);
(Continued)

(58) Field of Classification Search
CPC ......... B32B 15/08; B32B 15/12; B32B 27/10; B32B 2307/31; B32B 2307/412;
(Continued)

(56) References Cited

U.S. PATENT DOCUMENTS 2,183,330 A * 12/1939 Drew .......................... C09J 7/22
229/87.13
5,427,235 A * 6/1995 Powell .................... B32B 27/08
206/245
(Continued)

FOREIGN PATENT DOCUMENTS

CN 103228557 7/2013
CN 104114464 10/2014
(Continued)

OTHER PUBLICATIONS

PCT Search Report and Written Opinion for PCT/EP2017/079016 dated Jan. 5, 2018 (13 pages).
(Continued)

*Primary Examiner* — Bryon P Gehman
(74) *Attorney, Agent, or Firm* — Mueting Raasch Group

(57) ABSTRACT

A container for consumer goods comprises a package of consumer goods, the package being formed from a sheet blank. The sheet blank comprises a base layer comprising a fibrous cellulosic material; a metal-containing layer provided on an outer side of the base layer; and a first sealable layer comprising a sealable polymeric material provided on at least a seal area of an inner side of the base layer, wherein the first sealable layer is substantially transparent.

13 Claims, 1 Drawing Sheet

Figure 1:
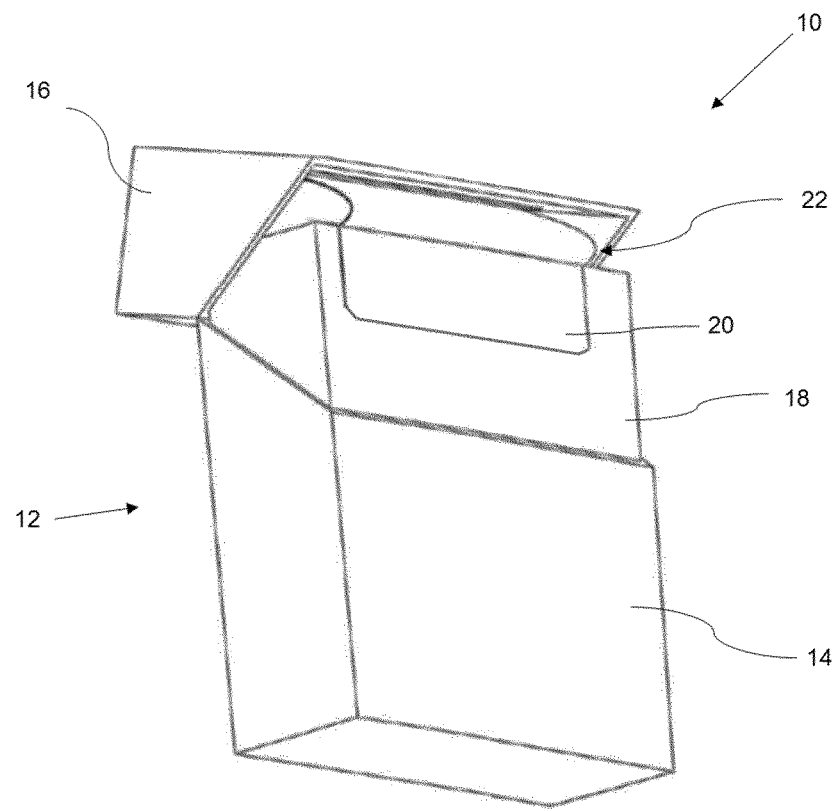

(51) Int. Cl.
*B32B 15/12* (2006.01)
*B32B 27/10* (2006.01)

(52) U.S. Cl.
CPC .......... *B32B 27/10* (2013.01); *B32B 2307/31* (2013.01); *B32B 2307/412* (2013.01); *B32B 2439/00* (2013.01); *B32B 2439/62* (2013.01)

(58) Field of Classification Search
CPC . B32B 2439/00; B32B 2439/62; B65D 85/10; B65D 85/1045
USPC .................................. 206/245, 256, 264, 268
See application file for complete search history.

(56) References Cited

U.S. PATENT DOCUMENTS

| | | | |
|---|---|---|---|
| 5,542,529 | A | 8/1996 | Hein |
| 7,798,320 | B2 * | 9/2010 | Pham ..................... B65D 75/66 206/264 |
| 9,089,165 | B2 | 7/2015 | Bertuzzi |
| 9,499,331 | B2 * | 11/2016 | Seyfferth De Oliveira ................. B65D 85/1045 |
| 2006/0278543 | A1 | 12/2006 | Pham |
| 2015/0021219 | A1 | 1/2015 | Seyfferth De Oliveira |
| 2015/0034509 | A1 | 2/2015 | Seyfferth |

FOREIGN PATENT DOCUMENTS

| | | |
|---|---|---|
| EP | 1 803 661 | 7/2007 |
| EP | 1803662 | 7/2007 |
| EP | 2907768 | 8/2015 |
| EP | 3093138 | 11/2016 |
| WO | WO 2013/120916 | 8/2013 |
| WO | WO 2016/166692 | 10/2016 |
| WO | WO 2017/148801 | 9/2017 |
| WO | WO 2018/091408 | 4/2018 |

OTHER PUBLICATIONS

Office Action issued in China for Application No. 201780066060.5 dated Jun. 12, 2020 (15 pages). English translation included.
Office Action issued in Singapore for Application No. 11201902298T dated Aug. 20, 2020 (8 pages).

* cited by examiner

INNER LINER FOR CONTAINER FOR CONSUMER ARTICLES

This application is a U.S. National Stage Application of International Application No. PCT/EP2017/079016 filed Nov. 13, 2017, which was published in English on May 24, 2018, as International Publication No. WO 2018/091398 A1. International Application No. PCT/EP2017/079016 claims priority to European Application No. 16199690.5 filed Nov. 18, 2016.

The present invention relates to a container for consumer goods. Containers in accordance with the present invention find particular application as containers for elongate consumer good items, such as smoking articles.

Smoking articles are typically packaged in rigid hinge-lid containers comprising a box and a lid hinged to the box along a hinge line extending across a back wall of the container. The bundle of smoking articles housed in the box is commonly wrapped in a package comprising an inner liner formed of a flexible sheet material.

A need persists in improving container features and functions with a view to enhancing eco-friendliness. In particular, in this regard, it would be desirable to provide a container for consumer goods wherein the content of polymeric materials is reduced in favour of an increased content of degradable or recyclable materials.

However, this should not impair usability and reliability, and so it would be desirable to provide one such container wherein the mechanical properties of the inner liner or package are substantially preserved or potentially even improved. Further, it would be desirable to provide one such container where the inner liner or package is better adapted to protecting the consumer articles and preserving their properties, particularly during the shelf life of the container.

Thus, it would be desirable to provide a novel and improved container for consumer foods comprising an inner liner or package that meets at least some of the needs described above. In addition, it would be desirable to provide one such container for consumer goods that can easily be manufactured without requiring major modifications to existing equipment.

According to an aspect of the present invention, there is provided a container for consumer goods comprising a package of consumer goods, the package being formed from a sheet blank.

The sheet blank comprises a base layer comprising a fibrous cellulosic material; a metal-containing layer provided on an outer side of the base layer; and a first sealable layer comprising a sealable polymeric material provided on at least a seal area of an inner side of the base layer, wherein the first sealable layer is substantially transparent.

As used herein, the terms "front", "back", "upper", "lower", "top", "bottom" and "side", refer to the relative positions of portions of containers according to the invention and components thereof when the container is in an upright position an access opening of the container at the top of the container. When describing containers according to the present invention, these terms are used irrespective of the orientation of the container being described. The back wall of the outer hinge-lid housing is the wall comprising the hinge line.

When describing a container in accordance with the present invention, the term "longitudinal" refers to a direction from bottom to top or vice versa, whereas the term "transverse" refers to a direction perpendicular to the longitudinal direction. For example, a "longitudinal axis of the container" is an axis extending from bottom to top or vice versa.

The term "width" is used to describe the dimension of an element, such as a panel of a blank or a wall of a container as measured in the transverse direction.

The term "panel" is used throughout this specification to refer to a portion of the blank that is used to form a wall in the assembled container. A panel may depend along one or more fold lines from one or more other panels.

The term "fold line" refers to a fold between two adjacent panels. When forming the container, adjacent panels are folded along their common fold line, which may come to define an edge of the container or of a portion of the container.

In the assembled container a "wall" may be formed of one or of several overlying panels. Where there are several overlying panels, these may be attached to each other, for example by means of an adhesive. Further, a wall may be formed from two or more abutting or overlapping panels.

The term "height" is used to describe the dimension of one such element as measured in a direction perpendicular to the width of the element. When describing an element of the blank, reference is generally made to the element in the flat state of the blank.

The term "thickness" is used herein to refer to the minimum distance measured between two opposite surfaces of the sheet blank or of a layer of the sheet blank. In practice, the distance at a given location is measured along a direction locally perpendicular to the opposite surfaces. The "thickness" of layer will generally be substantially constant over the layer (flat profile). However, local variations may be possible where portions of the sheet blank are, for example, embossed, debossed, weakened, and so forth.

The term "inner surface" is used throughout the specification to refer to the surface of a component of the assembled container that is facing towards the interior of the container, for example towards the consumer goods, when the container is in the closed position. The term "outer surface" is used throughout the specification to refer to the surface of a component of the container that is facing towards the exterior of the container. For example, the front wall of the container has an inner surface that is facing the inside of the container and the consumer goods, and an outer surface facing away from the consumer goods. It should be noted that the inside or outside surface is not necessarily equivalent to a certain side of a blank used in the assembly of the container. Depending on how the blank is folded around the consumer goods, areas that are on the same side of the blank can either face towards the inside or the towards the outside of the container.

The term "hinge line" refers to a line about which the lid may be pivoted in order to open the hinge-lid housing. A hinge line may be, for example, a fold line or a score line in the panel forming the back wall of the container.

The term "depending" is used herein to describe a physical connection between two elements of a container in accordance with the invention. In more detail, the term "depending" is used to indicate that there is a material continuity between two elements, such as two walls or panels of a container or blank. This encompasses both cases wherein a wall or panel depends directly from an adjacent wall or panel as well as cases wherein an intermediate wall or panel effectively connects two walls or panels.

By way of example, a side wall or panel may depend directly from an adjacent front wall or panel. In such case, the wall or panel typically depends along a fold line from the adjacent wall. As an alternative, especially in containers having curved or bevelled edges, a side wall or panel may depend indirectly from a front wall or panel. In such case a curved or bevelled edge wall or panel connects the side wall or panel and the front wall or panel. In the case of a bevelled edge, both side wall or panel and front wall or panel may depend from the connecting bevelled edge wall or panel along respective fold lines. This also applies to optional components of containers in accordance with the invention, for example to a reinforcing member provided in the form of an inner frame.

The term "substantially transparent" is used to describe a material which allows at least a significant proportion of incident light to pass through it, so that it is possible to see through the material in the visible spectrum. In the present invention, a substantially transparent sealable layer allows sufficient light to pass through it that the underlying layer (for example, a metal-containing layer or a paper-containing layer) is visible through the sealable layer.

The substantially transparent sealable layer material may be completely transparent. Alternatively, the material forming the sealable layer may have a lower level of transparency whilst still transmitting sufficient light that the underlying layer is visible through the sealable layer.

The term "lines of weakness" is used herein to describe a portion of a surface of the package (or the blank from which the package is formed) wherein the structural strength of the material, from which the package (or blank) is formed has been weakened by any suitable technique, for example with respect to bending, folding or tearing along the line of weakness. For example, a line of weakness may be formed as a scoring line, a creasing line, an ablation line, or a perforation line. Lines of weakness can be created by removal of material, by displacement of material, by compression of material, by locally reducing the forces that hold the material together, such as by breaking fibres in a fibrous material, as well as by combinations of all the above. A line of weakness may be straight, curved, segmented or continuous or a combination thereof. In many instances, a line of weakness is used to assist in positioning a fold line in a blank. A line of weakness can also be used to strengthen the material in a direction perpendicular to the line of weakness, for example by compression. Further, a line of weakness can be used for decorative purpose.

The term "scoring line" is used to describe a line formed by partially cutting into the material of the blank. A scoring line may be formed by removing material from the blank (in which case the scoring line forms a groove or trough in the blank). As an alternative, a scoring line may be formed without removing any material from the blank, typically involving a partial sideways displacement and compression of material, caused by a knife with a non-zero thickness penetrating the material. The depth of the scoring line will be less than the thickness of the blank.

The term "creasing line" is used to describe a line formed by displacing a portion of the material vertical to the plane of the blank, forming a groove or trough in the blank. The displacement may involve compression and typically involves the use of a compression tool, such as a roller. Alternatively, or in addition, the material in the creasing line may be displaced so as to at least partially protrude from the opposite side of the blank. Generally, no material is removed when a creasing line is formed.

The term "ablation line" is used to describe a line formed by removing material from a surface of the blank to a predetermined depth by way of ablation (for example, by way of a laser beam or a blade).

The term "perforated line" is used to describe a line or sequence of discrete holes or slots in the blank. The holes may be formed by pushing an object through the blank. This may result in material being removed from the blank, for example by punching. Alternatively, the holes could be created without removing material, and instead simply using the object to push the material outwardly from the centre of the hole. As another alternative, the holes may be formed by way of a laser beam.

The term "fold line" is used to describe any line of a blank about which the blank is folded. The fold line may be defined by a line of weakness to assist with the folding action. Alternatively, a fold can be formed without the presence of a weakening line, depending for example on the pliability of the blank material and other material characteristics.

A container for consumer goods in accordance with the present invention comprises a package of consumer goods, wherein the package is formed by folding a multi-layer blank about a group of consumer goods. In contrast to existing containers, the blank comprises: a base layer comprising a fibrous cellulosic material; a metal-containing layer provided on an outer side of the base layer; and a first sealable layer comprising a sealable polymeric material provided on at least a seal area of an inner side of the base layer, wherein the first sealable layer is substantially transparent.

Containers in accordance with the present invention have a higher content of degradable materials and recyclable materials compared with existing containers. Accordingly, the environmental friendliness of the containers is advantageously increased, and the consumer can easily perceive this, particularly in those embodiments where the sealable layer is transparent and allows the underlying base layer to be seen.

Further, in containers in accordance with the invention, the higher content of fibrous material may make the blank easier to bend in a more stable manner compared, for example, with blanks having a greater content of polymeric materials. Without wishing to be bound by theory, this is understood to be because the cellulosic fibres can be at least partly broken during bending, and so it is easier to achieve a desirable bending of the sheet material even by locally compressing the sheet material along a fold line. By contrast, the removal of some of the material would in all likelihood be required with blanks with a higher polymeric content.

At the same time, the packages of containers in accordance with the invention are effectively sealable, such that it is easy to preserve the properties of the consumer goods within a package, particularly during the shelf life of the container.

In addition, the polymeric material in the sealable layer provides the seal area on the inner side of the base layer with a smoother finish compared with the inherent unevenness of the fibrous cellulosic material contained in the base layer. The sealable layer also advantageously helps occlude pores and channels that may typically be present in the underlying fibrous base layer, so that leaks across the base layer are desirably prevented. This is particularly advantageous in the area surrounding the access opening of the package. Similarly advantageous effects are obtained in embodiments comprising a further sealable layer provided on the outer side of the metal-containing layer, as shall be explained in more detail below.

At the same time, because the first resealable layer is substantially transparent, the consumer is advantageously allowed to see the underlying cellulosic fibre based layer at all times. This makes it easier for the consumer to perceive the package as having an increased eco-friendliness. Further, if any indicia are provided on the inner surface of the cellulosic fibre based layer, such as registration marks, these can still be easily optically detected through the first sealable layer, such that automation of the manufacturing process is advantageously facilitated. Containers according to the invention are easy to manufacture and do not require any substantial modification of the existing packing apparatus. In particular, there is substantially no need to modify the folding process for forming the package or the format of the packing machine handling the sheet blank.

The base layer and the metal-containing layer may be adhered to each other by means of an adhesive provided on at least a portion of the outer surface of the base layer or on at least a portion of the inner surface of the metal-containing layer or both.

Preferably the package is formed by folding the blank such that ends of the blank are brought together so as to overlie to form a wrapping about a group of consumer goods. The seal area extends at least partly over the overlying ends of the blank, and the overlying ends of the blank are sealed together. This is advantageous in that one such package is sealed and so the properties of the consumer goods within the package can easily and effectively be preserved.

In some embodiments, the overlying ends of the blank may be sealed together to form a fin seal. In other embodiments, the overlying ends of the blank may be sealed together to form an envelope seal.

In some preferred embodiments, the first sealable material extends substantially over the whole base layer. This may advantageously simplify the manufacturing process.

Preferably, the blank further comprises a second sealable layer comprising a sealable polymeric material and provided on at least a seal area of an outer side of the metal-containing layer. Even more preferably, the second sealable layer is substantially transparent. Thus, the consumer may advantageously see the metal-containing layer. In addition, this advantageously further increases the sealing properties of the container.

Suitable sealable polymeric material for inclusion in either one of the first and second sealable layers include polyolefin-based and acrylic-based polymers. In some preferred embodiments, the sealable material comprises polyethylene or polypropylene.

In preferred embodiments, the second sealable layer extends substantially over the whole metal-containing layer. This may further simplify the manufacturing process. In addition, one such package may have a more uniform visual and tactile impact on the consumer.

Preferably, a thickness of the metal-containing layer is at least about 2 micrometres. More preferably, the thickness of the metal-containing layer is at least about 5 micrometres. Still more preferably, the thickness of the metal-containing layer is at least about 15 micrometres. Even more preferably, the thickness of the metal-containing layer is at least about 30 micrometres. In addition, or as an alternative, the thickness of the metal-containing layer is less than about 45 micrometres. More preferably, the thickness of the metal-containing layer is less than about 40 micrometres.

Preferably, a basis weight of the metal-containing layer is at least about 20 grams per square metre. More preferably, the basis weight of the metal-containing layer is at least about 25 grams per square metre. Even more preferably, the basis weight of the metal-containing layer is at least about 30 grams per square metre. In addition, or as an alternative, the basis weight of the metal-containing layer is preferably less than about 45 grams per square metre. More preferably, the basis weight of the metal-containing layer is less than about 40 grams per square metre. Even preferably, the basis weight of the metal-containing layer is less than about 35 grams per square metre. In particularly preferred embodiments, the basis weight of the metal-containing layer is from about 25 grams per square metre to about 35 grams per square metre. A basis weight of the metal-containing layer of about 30 grams per square metre is particularly preferred.

Preferably, a thickness of the base layer is at least about 40 micrometres. More preferably, the thickness of the base layer is at least about 50 micrometres. Even more preferably, the thickness of the base layer is at least about 60 micrometres. In addition, or as an alternative, the thickness of the base layer is less than about 90 micrometres. More preferably, the thickness of the base layer is less than about 80 micrometres. Even more preferably, the thickness of the base layer is less than about 70 micrometres. In particularly preferred embodiments, the thickness of the base layer is from about 60 micrometres to about 70 micrometres. A thickness of the base layer of about 65 micrometres is particularly preferred.

Preferably, a ratio between the thickness of the metal-containing layer and the thickness of the base layer is at least about 0.05. More preferably, the ratio between the thickness of the metal-containing layer and the thickness of the base layer is at least about 0.2. In addition, or as an alternative, the ratio between the thickness of the metal-containing layer and the thickness of the base layer is preferably less than about 1. More preferably, the ratio between the thickness of the metal-containing layer and the thickness of the base layer is less than about 0.6. In particularly preferred embodiments, the ratio between the thickness of the metal-containing layer and the thickness of the base layer is from about 0.2 to about 0.6.

Preferably, a basis weight of the base layer is at least about 25 grams per square metre. More preferably, the basis weight of the base layer is at least about 35 grams per square metre. Even more preferably, the basis weight of the base layer is at least about 40 grams per square metre. In addition, or as an alternative, the basis weight of the base layer is preferably less than about 65 grams per square metre. More preferably, the basis weight of the base layer is preferably less than about 60 grams per square metre. Even more preferably, the basis weight of the base layer is less than about 55 grams per square metre. In particularly preferred embodiments, the basis weight of the base layer is from about 40 grams per square metre to about 55 grams per square metre. A basis weight of the base layer of about 50 grams per square metre is particularly preferred.

In preferred embodiments, the base layer comprises at least 30 percent by weight of the fibrous cellulosic material. More preferably, the base layer comprises at least 50 percent by weight of the fibrous cellulosic material. Even more preferably, the base layer comprises at least 70 percent of the fibrous cellulosic material. In some particularly preferred embodiments, the base layer is substantially entirely formed of the fibrous cellulosic material. By way of example, the base layer may be formed from a sheet of paper. Higher contents of the fibrous cellulosic material facilitate the bending of the sheet blank when forming the package around the group of consumer goods and so simplify the manufacturing process. At the same time, higher contents of the fibrous cellulosic material make the base layer more easily degradable.

In some embodiments, the sheet blank may optionally comprise one or more additional layers. By way of example, the sheet blank may comprise a gloss layer extending over at least a portion of the inner surface of the base layer. The gloss layer comprises one or more pigments, such as satin white, kaolin, calcium carbonate, and is adapted to impart the base layer a smooth finish and gloss.

Indicia, such as for example registration marks, may be provided on the outer surface of the metal-containing layer or on the inner surface of the base layer or on both. The term "indicia" is used to refer to a discrete printed or non-printed element, or to repeating printed or non-printed patterns. In some embodiments, the indicia may be in the form of an embossed or debossed portion of a blank surface.

In some embodiments, the container further comprises an outer housing comprising a box and a lid, wherein the lid is hinged to the box along a hinge line extending across a back wall of the outer housing. A package as described above is received within the box.

In some embodiments, the package comprises lines of weakness formed in all the layers of the sheet blank, the lines of weakness delimiting a cover member that is at least partially separable from the remainder of the package to make an access opening available for removing consumer goods from the package. In more detail, the lines of weakness may for example delimit a panel at the front and on the sides, the panel thus being pivotable about a back hinge line.

Preferably, the package has an access opening through which consumer goods can be removed and comprises a reclosable sealing cover member occluding the access opening, such that the cover member is movable from a closed position, wherein the cover member overlies at least the access opening, and an open position, wherein the cover member is lifted off the outer surface of the package. The reclosable cover member is permanently affixed to an inner surface of the lid, such that upon opening the lid the reclosable cover member is moved from the closed position towards the open position to at least partly reveal the access opening.

In some embodiments, the reclosable sealing cover member comprises a reclosable adhesive label extending beyond the periphery of the access opening. The reclosable adhesive label is at least partly permanently affixed to the package by a permanent adhesive provided on a back hinge area of the inner surface of the reclosable adhesive label, and at least partly releasably affixed to the package by a resealable adhesive provided on a second area of the inner surface of the reclosable adhesive label extending at least about a front edge of the access opening.

In these embodiments, lines of weakness may be formed in the package, such that an at least partially separable panel of the package is permanently affixed to the reclosable sealing cover member and effectively moves with the cover member between a closed position and an open position. By way of example, the panel may be at least partly separated from the remainder of the package upon opening the lid for the first time.

In other embodiments, the reclosable sealing cover member comprises a reclosable adhesive label extending beyond the periphery of the access opening and comprising at least a bottom layer and a top layer. The bottom layer is affixed to the package by means of a permanent adhesive provided on a first area of the inner surface of the bottom layer extending about the periphery of the access opening, the bottom layer comprising a cut-out portion at least partly aligned with the access opening of the package. The top layer is at least partly permanently affixed to the bottom layer by means of a permanent adhesive provided on a back hinge area of the inner surface of the top layer, and at least partly releasably affixed to the bottom layer by means of a second adhesive provided on a peeling area of the inner surface of the top layer extending distal from the hinge area, such that the top layer is movable from a closed position, wherein the top layer overlies at least the access opening, and an open position, wherein the top layer is lifted off the bottom layer to reveal the cut-out portion.

In some preferred embodiments, the reclosable sealing cover member comprises a cover member base layer comprising a fibrous cellulosic material; a cover member metal-containing layer provided on an outer side of the cover member base layer; and a first cover member sealable layer comprising a sealable polymeric material provided on an inner side of the cover member base layer. This is advantageous in that the content of polymeric materials in the container is further reduce in favour of degradable materials and recyclable materials, and so the environmental impact of the container is desirably reduced. At the same time, one such reclosable cover member displays desirable sealing properties, and so it makes it easier for the properties of the consumer goods within the container to be preserved for longer. In addition, one such reclosable cover member has mechanical properties that make it reliable for use in applications wherein the same cover member is used for repeatedly opening and closing the container.

Preferably, the reclosable sealing cover member further comprises a second cover member sealable layer comprising a sealable polymeric material between the cover member metal-containing layer and the cover member base layer. This advantageously further improves the sealing properties of the reclosable cover member.

The hinge-lid container may optionally comprise an outer wrapper, which is preferably a transparent polymeric film of, for example, high or low density polyethylene, polypropylene, oriented polypropylene, polyvinylidene chloride, cellulose film, or combinations thereof and the outer wrapper is applied in a conventional manner. The outer wrapper may include a tear tape. In addition, the outer wrapper may be printed with images, consumer information or other data.

Containers according to the invention find particular application as containers for elongate smoking articles such as, for example, cigarettes, cigars, cigarillos or other aerosol generators that rely on heating rather than burning tobacco, for example through an electrical heat source or carbon heat source. It will be appreciated that through appropriate choices of the dimensions thereof, containers according to the invention may be designed for different numbers of conventional size, king size, super-king size, slim or super-slim cigarettes. Alternatively, other consumer goods may be housed inside the container.

Through an appropriate choice of the dimensions, containers according to the invention may be designed to hold different total numbers of smoking articles, or different arrangements of smoking articles. For example, through an appropriate choice of the dimensions, containers according to the invention may be designed to hold a total of between ten and thirty smoking articles. The smoking articles may be arranged in different collations, depending on the total number of smoking articles.

Figure 2:
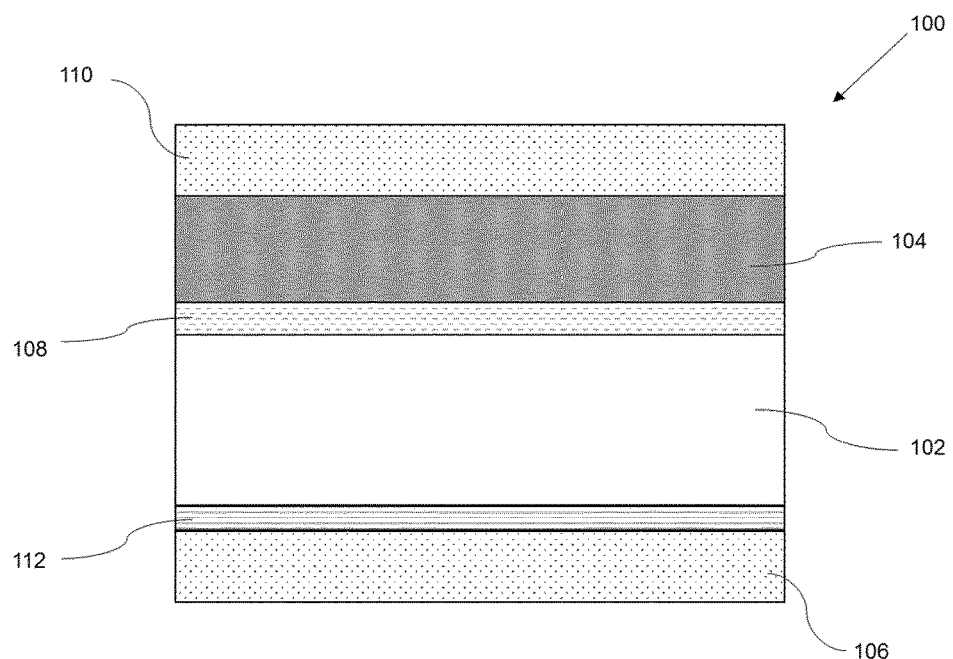

The invention will now be further described, by way of example only, with reference to the accompanying drawings in which:

FIG. 1 is a schematic perspective view of an embodiment of a container in accordance with the present invention; and FIG. 2 is a schematic partial side sectional view of a package of container in accordance with the present invention.

FIG. 1 shows a container 10 in accordance with the present invention. The container 10 comprises an outer housing 12 which is a rectangular parallelepiped and includes a box 14 and a lid 16. The lid 16 is hinged about a hinge line extending across a back wall of the housing 12 and is pivotable between an open position (shown in FIG. 1) and a closed position. Further, the container 10 comprises an inner package 18 containing a group of smoking articles and housed in the box 14.

The package 18 is formed from a sheet blank 100. As illustrated in FIG. 2, the sheet blank 100 comprises a base layer 102 comprising a fibrous cellulosic material; a metal-containing layer 104 provided on an outer side of the base layer 102; and a first sealable layer 106 comprising a sealable polymeric material provided on at least a seal area of an inner side of the base layer 102. In more detail, the base layer 102 is formed from a sheet of a paper-based material having a thickness of about 65 micrometres and a base weight of about 50 grams per square metre. The metal-containing layer 104 is formed from an aluminium foil having a thickness of about 12 micrometres and a base weight of about 32 grams per square metre. The base layer 102 is adhered to the metal-containing layer 104 by means of an adhesive 108 provided between the two layers. The first sealable layer 106 comprises a polyolefin based material, preferably polyethylene, and is substantially transparent. The package 18 is formed by folding the sheet blank 100 about a group of smoking articles so as to form a wrapping with the base layer 102 facing towards the smoking articles and the metal-containing layer facing away from the smoking articles. Overlapping ends of the wrapping are sealed together by means of the sealable polymeric material of the first sealable layer 106, for example by applying heat to the overlapping ends of the wrapping.

In the embodiment illustrated in FIG. 2, the sheet blank 100 further comprises a second sealable layer 110 comprising a sealable polymeric material and provided on at least a seal area of an inner outer side of the metal-containing layer 104. The second sealable layer 110 comprises a polyolefin based material, preferably polyethylene, and is substantially transparent.

In addition, the sheet blank 100 comprises a gloss layer 112 extending over the inner surface of the base layer 102. The gloss layer comprises one or more pigments adapted to impart the base layer a smooth finish and gloss.

The package 18 comprises an access opening 20 extending across the top wall and the front wall of the inner package. The smoking articles contained in the inner package 18 can be removed through the access opening when the lid 16 is in the open position. The inner package 18 comprises a reclosable cover member 22 occluding the access opening 20 of the package and extending beyond the periphery of the access opening of the package. The cover member 20 is movable from a closed position, wherein the cover member overlies at least the access opening, and an open position (illustrated in FIG. 1), wherein the cover member is lifted off the outer surface of the package 18.

Further, the reclosable cover member 22 is permanently affixed to an inner surface of the lid 16, such that upon opening the lid 16 the reclosable cover member 22 is moved from the closed position towards the open position to at least partly reveal the access opening 20.

In the embodiment of FIG. 1 the reclosable sealing cover member 22 comprises a reclosable adhesive label extending beyond the periphery of the access opening 20. The reclosable adhesive label is at least partly permanently affixed to the package by a permanent adhesive provided on a back hinge area of the inner surface of the reclosable adhesive label. Further, the reclosable adhesive label is at least partly releasably affixed to the package 18 by a resealable adhesive provided on a second area of the inner surface of the reclosable adhesive label extending at least about a front edge of the access opening 20.

The invention claimed is:

1. A container for consumer goods comprising:
an outer housing comprising a box and a lid, the lid being hinged to the box along a hinge line extending across a back wall of the outer housing; and
a package of consumer goods received within the box, the package having an access opening through which the consumer goods can be removed and being formed from a sheet blank comprising:
a base layer comprising a fibrous cellulosic material;
a metal-containing layer provided on a first side of the base layer, wherein, in the assembled container, the first side of the base layer defines an outer surface of the package; and
a first sealable layer comprising a sealable polymeric material and provided on at least a seal area of a second side of the base layer opposite the first side, wherein, in the assembled container, the second side of the base layer defines an inner surface of the package, and
wherein the first sealable layer is substantially transparent,
wherein the package is formed by folding the blank such that ends of the blank are brought together so as to overlie to form a wrapping about the consumer goods; wherein the seal area extends at least partly over the overlying ends of the blank and the overlying ends of the blank are sealed together.

2. A container in accordance with claim 1, wherein the first sealable layer extends substantially over the whole base layer.

3. A container in accordance with claim 1, wherein the blank further comprises a second sealable layer comprising a sealable polymeric material and provided on at least a seal area of an outer side of the metal-containing layer.

4. A container in accordance with claim 3, wherein the second sealable layer extends substantially over the whole metal-containing layer.

5. A container in accordance with claim 1, wherein a thickness of the metal-containing layer is from about 2 micrometres to about 10 micrometres.

6. A container in accordance with claim 1, wherein a basis weight of the base layer is at least about 25 grams per square metre.

7. A container in accordance with claim 1, wherein the base layer comprises at least 30 percent by weight of the fibrous cellulosic material.

8. A container in accordance with claim 1, wherein the package comprises lines of weakness formed in the base layer, the metal-containing layer and the first sealable layer of the sheet blank, the lines of weakness delimiting a cover member of the package that is at least partially separable from the remainder of the package to make the access opening available for removing consumer goods from the package.

9. A container in accordance with claim 1, wherein the package comprises a reclosable sealing cover member occluding the access opening, such that the cover member is movable from a closed position, wherein the cover member overlies at least the access opening, and an open position, wherein the cover member is lifted off the outer surface of the package; and wherein the reclosable cover member is permanently affixed to an inner surface of the lid, such that upon opening the lid the reclosable cover member is moved from the closed position towards the open position to at least partly reveal the access opening.

10. A container in accordance with claim 9, wherein the reclosable sealing cover member comprises a reclosable adhesive label extending beyond the periphery of the access opening; the reclosable adhesive label being at least partly permanently affixed to the package by a permanent adhesive provided on a back hinge area of the inner surface of the reclosable adhesive label, and at least partly releasably affixed to the package by a resealable adhesive provided on a second area of the inner surface of the reclosable adhesive label extending at least about a front edge of the access opening.

11. A container in accordance with claim 9, wherein the reclosable sealing cover member comprises a reclosable adhesive label extending beyond the periphery of the access opening and comprising at least a bottom layer and a top layer; the bottom layer being affixed to the package by means of a permanent adhesive provided on a first area of the inner surface of the bottom layer extending about the periphery of the access opening, the bottom layer comprising a cut-out portion at least partly aligned with the access opening of the package; the top layer being at least partly permanently affixed to the bottom layer by means of a permanent adhesive provided on a back hinge area of the inner surface of the top layer, and at least partly releasably affixed to the bottom layer by means of a second adhesive provided on a peeling area of the inner surface of the top layer extending distal from the hinge area, such that the top layer is movable from a closed position, wherein the top layer overlies at least the access opening, and an open position, wherein the top layer is lifted off the bottom layer to reveal the cut-out portion.

12. A container in accordance with claim 9, wherein the reclosable sealing cover member comprises:
 a cover member base layer comprising a fibrous cellulosic material;
 a cover member metal-containing layer provided on an outer side of the cover member base layer; and
 a first cover member sealable layer comprising a sealable polymeric material provided on an inner side of the cover member base layer.

13. A container in accordance with claim 12, wherein the reclosable sealing cover member further comprises a second cover member sealable layer comprising a sealable polymeric material between the cover member metal-containing layer and the cover member base layer.

\* \* \* \* \*